Nov. 10, 1959   K. DAWKINS ET AL   2,912,650
NONPOLARITY SENSITIVE INDICATING DEVICE
Filed May 7, 1956
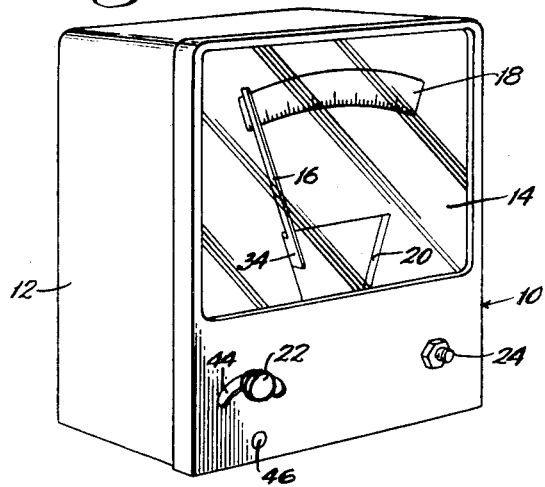
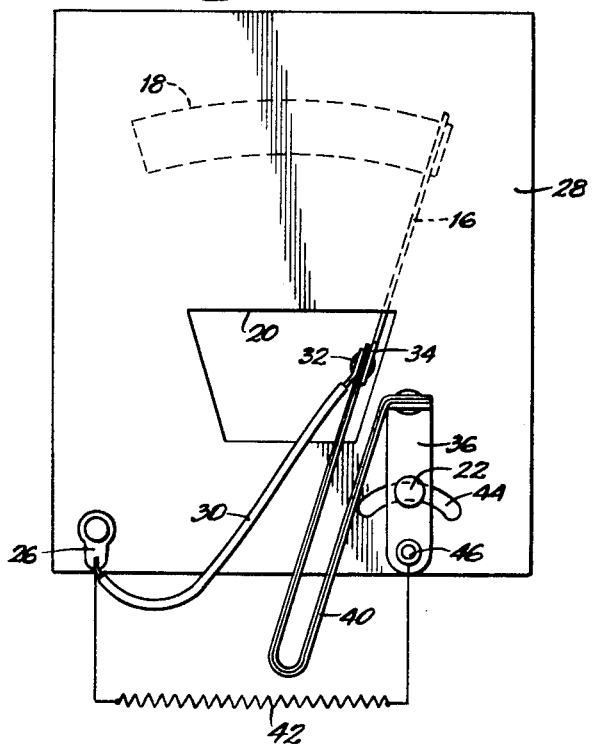
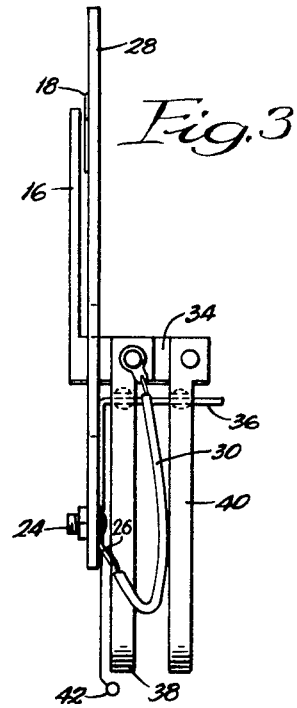
INVENTORS:
Kenneth Dawkins
and Wallace G. Lind,
BY Bair, Freeman & Molinare
ATTORNEYS.

United States Patent Office 2,912,650
Patented Nov. 10, 1959

2,912,650

NONPOLARITY SENSITIVE INDICATING DEVICE

Kenneth Dawkins and Wallace G. Lind, Minneapolis, Minn., assignors to Franklin Manufacturing Company, Minneapolis, Minn., a corporation of Minnesota Application May 7, 1956, Serial No. 583,258

2 Claims. (Cl. 324—106)

This invention relates generally to indicating devices and more particularly to electrical indicating devices of the nonpolarity-sensitive type.

Many of the electrical indicating instruments known in the prior art are of the polarity-sensitive type—that is, they must be connected to the electrical circuit whose condition is to be measured only in a predetermined manner at the risk of serious damage to the instrument.

To avoid this liability a number of electrical indicating instruments are known which are nonpolarity-sensitive and which therefore may be connected in any desired fashion with respect to the polarity to an electrical circuit. The best known of such prior art instruments are those of the electromagnetic and cathode ray oscillograph type, the electrodynamometer type, the induction metal type and the so-called hot wire ammeter type.

Each of the above nonpolarity-sensitive instruments has the disadvantage of being costly to manufacture due to the comparatively complex nature of the components used therein. In addition, these parts generally are rather delicate and therefore very sensitive to handling. In view of these considerations these prior art instruments, while normally satisfactory for laboratory and other similar applications, generally are not suitable for many home and industrial uses such as with home appliances, garage and service station equipment and the like wherein rough usage is commonplace.

Accordingly, it is an object of this invention to provide an improved nonpolarity-sensitive indicating device.

It is another object of this invention to provide an improved nonpolarity-sensitive indicating device of increased ruggedness and reliability such that the device is not damaged or easily caused to be out of adjustment when roughly handled.

It is a further object of this invention to provide an improved indicating device for measuring current flow in an electrical circuit and providing accurate indications thereof which automatically compensates for ambient temperature variations within a substantially wide range.

It is a still further object of this invention to provide an improved current indicating device which is both simple and inexpensive to manufacture and which is designed for a relatively long life of operation.

These and other objects are realized in a specific illustrative embodiment of the invention wherein the current sensitive element comprises a bimetal of cross-section and length suitable to the amplitude of the current to be measured; the degree of movement of the bimetal is dependent upon its size, the amount of current passed through it and the particular combination of metals utilized in its construction.

The indicating device automatically compensates for variations in temperature other than those due to the measured current by the provision of a temperature compensating bimetal associated with the current carrying bimetal. It is a feature of this invention that the two bimetals be formed for movement in opposite directions to the end that they automatically place opposite strains upon each other when the device is subjected to ambient variations in temperature.

In accordance with a further feature of this invention a scale is provided and has marked thereon appropriate reference indicia such as amperes, voltages, hot and/or cold and the like. A pointer is secured to the current carrying bimetal and the temperature compensating bimetal in indicating relation with the reference indicia on the scale. Thus, the pointer is responsive primarily to the current flow through the current carrying bimetal, as variations in temperature not due to this current flow are compensated for by the opposing strains transmitted by the current carrying and temperature compensating bimetals.

In accordance with further features of this invention the indicating device may be adjusted to various ranges of current as desired by the provision of current shunting resistances connected in parallel with the current carrying bimetal. Further, the indicating device may be adjusted to zero in a simple manner by varying the shapes of the bimetals. Still further, the sensitivity of the indicating device may be adjusted by proper design of the shapes of the bimetals and by varying the number of bimetals as desired, the only requirement being that the current carrying and temperature compensating bimetals must be of identical size and form but opposite in effect.

The above and other features of novelty which characterize the invention are pointed out with particularity in the claims annexed to and forming a part of this specification. For a better understanding of this invention, however, its advantages and specific objects attained with its use reference is had to the accompanying drawing and descriptive material in which is shown and described an illustrative embodiment of the invention.

In the drawing:

Figure 1 is a perspective view of a current indicating meter embodying the invention;

Figure 2 is a rear elevational view of the current responsive and temperature compensating mechanism in accordance with the invention; and Figure 3 is a side elevational view of the mechanism of Figure 2.

Referring now to the drawing an illustrative embodiment of the invention is shown therein in the form of a current indicating meter 10. Advantageously meter 10 may comprise an outer casing 12 which is formed of any suitable material such as metal, plastic or the like. The indicating portions of the meter are disposed behind a transparent sight 14 provided at the front of casing 12. Sight 14 serves both as a protective cover for the meter and as a window for enabling the user to view the indicating portion of the meter, and thus may be formed of any sturdy transparent material such as glass, plastic or the like. The details of casing 12 and sight 14 are well known and do not form a part of the invention as such.

The meter comprises a pair of current receiving terminals 22 and 24 which extend through casing 12 for enabling connection to be made to the circuit whose electrical condition is to be measured. Terminal 24 is connected at the interior of casing 12 to a terminal lug 26, which terminal lug is in turn connected to a current carrying bimetal 38 by means of a flexible conductor 30 and a rivet 32. Flexible conductor 30 advantageously may be formed of multi-stranded or braided copper wire and should be long enough to permit bimetal 38 to freely traverse its range of movement without interference.

The current circuit is completed through current carrying bimetal 38 and mounting bracket 36 which carries terminal 22 and is connected to mounting panel 28 by rivet 46. Current carrying bimetal 38 in the illustrative embodiment is substantially U-shaped and has one leg thereof rigidly secured by rivet 32 to a bridge 34 which advantageously is formed of an electrical insulating material. A temperature compensating bimetal 40 of similar shape and size as bimetal 38 also has one leg thereof rigidly secured to bridge 34 and the other end thereof attached to mounting bracket 36. It will be noted that although the two bimetals 38 and 40 are similarly mounted to bridge 34 and mounting bracket 36 they are electrically isolated from each other and that only bimetal 38 is in the current carrying circuit.

A mounting panel 28 which preferably is formed of a rigid insulating material, has marked on the front face thereof a dial or scale 18 calibrated with suitable reference indicia such as amperes, voltages, hot and cold, good and bad and the like depending upon the use to which the measuring device is put. One end of bridge 34 extends through an opening 20 in mounting panel 28 and has attached thereto a pointer 16 in indicating relation with scale 18. Advantageously, bridge 34 and pointer 16 are integrally formed such as by punching a rigid insulating material having suitable dimensional stability under heat.

In accordance with an aspect of this invention current carrying bimetal 38 and temperature compensating bimetal 40 are of similar size and shape but have opposite temperature responsive characteristics. Thus, if in response to an increase in temperature one of these bimetals expands so as to cause greater spacing between its legs the other bimetal will contract to reduce the spacing between its legs. The two bimetals may be formed with these characteristics by proper choice of materials and the order in which the materials are combined. It now will be appreciated that if the meter is subjected to temperature variations or ambients during its operation which are not due to the passage of current through the meter, the two bimetals will automatically place opposing strains upon each other through bridge 34 and maintain the accuracy of the meter. It has been found in a meter constructed in accordance with the invention that no discernible movement of the pointer was observed in the range of temperatures from zero degrees F. to 130° F.

In the operation of the invention the current to be measured passes from one of terminals 22 or 24 through flexible conductor 30, current carrying bimetal 38 and out through the remaining terminal 22 or 24. This current flow will heat up current carrying bimetal 38 and cause it to expand and deflect pointer 16 over scale 18. As the amount of expansion of current carrying bimetal 38 is dependent upon the amount of current flow therethrough and upon its own expansion characteristics, scale 18 may be calibrated to provide an accurate indication of this current flow or of the condition to be measured as represented by this current flow.

It will further be appreciated that not only is the construction of the invention relatively simple and inexpensive but that it may be used with either alternating current voltages or direct current voltages without regard to polarity and without fear of damage to the meter.

It is contemplated that meter 10 may be adapted to currents within widely varying ranges by the use of current dividing resistances connected in shunt with terminals 22 and 24. For example, full scale deflection of the meter with no shunt resistance connected across terminals 22 and 24 may be obtained in one embodiment of the invention when current having a value of 3 amperes is passed through current carrying bimetal 38. If, the current carrying bimetal has a resistance 42 of one ohm value connected in shunt thereacross, the meter will have a full scale deflection of 6 amperes, as 3 amperes will flow through each path. Manifestly by lowering the ohmic value of the meter current path through the use of shunt resistances any desired full scale deflection may be obtained.

It further is contemplated that meter 10 may be employed to measure voltage as well as current. When used as a voltmeter the invention is connected in parallel to the circuit whose voltage is to be measured and current consumption by the meter may be reduced by placing suitable resistance in series with the meter. Advantageously, meter current consumption in this utilization may be reduced by decreasing the cross-section of bimetals 38 and 40 to a suitable value.

The meter may be adjusted other than by the use of shunts of different values in the following ways. Zero adjustment of pointer 16 with respect to scale 18 may be made by squeezing or separating bimetals 38 and 40 equally at their radius points. A preferred method would be to place an arcuate slot 44 in mounting panel 28 at the point where terminal 22 is connected to mounting bracket 36 such that the position of mounting bracket 36 may be pivoted on rivet 46 to zero adjust pointer 16.

Design adjustment may be made in meter performance by varying the dimensions of the bimetal legs. In the preferred embodiment discussed above the legs of each bimetal are shown to be of equal length but an increase or decrease of either leg of each bimetal would serve to influence movement of pointer 16 for a given amount of current passing through current carrying bimetal 38.

It also is contemplated that design adjustment may be made by compounding the temperature responsive mechanism, that is, a number of current carrying bimetals and an equal number of temperature compensating bimetals may be mechanically paralleled such that different electrical values can then be imposed on the current carrying bimetals to obtain a composite or compound reading. For example, one current carrying bimetal may be used for measuring volts and another bimetal may be used for measuring amperes with the result that a reading in watts may be obtained.

It also is contemplated that design adjustment may be made by varying the shape of the bimetals. For example instead of having the U-shape shown in the drawing both bimetals could be wound in the form of a concentric spring. The only requirement is that both the current carrying and the temperature compensating bimetals be of identical size and form but opposite in temperature responsive effect.

While a particular embodiment of the invention has been described in detail for the purpose of teaching the principles of the invention it will be understood by those skilled in the art that this embodiment is illustrative only and is not to be taken as a definition of the scope of the invention, reference being had for this purpose to the appended claims.

What is claimed is:

1. A portable meter for measuring an electrical condition which comprises the combination of first and second terminal members adapted to be connected to a source of electrical energy, a first substantially U-shaped bimetal having one end thereof electrically connected to said first terminal member, said first bimetal having said one end adapted to move in a given direction in response to an increase in temperature thereof resulting from current flow therethrough, a second substantially U-shaped bimetal having one end adapted to move in a direction opposite said given direction in response to an increase in temperature thereof, said first and second bimetals being positioned in adjacent, superimposed relationship to each other, a panel having a scale with suitable indicia marked thereon and having an arcuate slot formed therein, a pointer in indicating relation to said scale, a bridge connecting said pointer and said one ends of each of said first and second bimetals in non-conducting relation with each other, said bridge being formed of insulating material and being adapted to transmit the opposing forces of said first and second bimetals to said pointer for providing indications of the resultant forces therebetween, means for adjusting the pointer with respect to said scale comprising a bracket of conductive material pivotally mounted on and in electrical contact with said second terminal member so as to be in sliding relation with said slot, finger receiving knob means connected to said bracket at said slot for enabling the bracket to be adjusted to a selected position, and fastening means securing the other end of each of said bimetals to said bracket.

2. A portable meter for measuring an electrical condition in accordance with claim 1 further comprising current dividing resistance means connected across said first and second terminal members in parallel circuit with said first bimetal to provide selective adjustment of the full scale deflection of said meter and said scale.

References Cited in the file of this patent

UNITED STATES PATENTS

| | | |
|---|---|---|
| 690,059 | Isham | Dec. 31, 1901 |
| 845,995 | Benecke | Mar. 5, 1907 |
| 2,112,047 | Rich | Mar. 22, 1938 |
| 2,303,217 | Malone | Nov. 24, 1942 |
| 2,313,758 | Matthews | Mar. 16, 1943 |